RECORD CARD PROCESSING MACHINE

Filed Dec. 27, 1962 5 Sheets-Sheet 1

INVENTORS
GLEN F. NIELSEN
DONALD K. REX
LAWRENCE A. WILSON
BY
Otto Schmid, Jr.
AGENT Sept. 21, 1965 G. F. NIELSEN ETAL 3,207,505

RECORD CARD PROCESSING MACHINE

Filed Dec. 27, 1962 5 Sheets-Sheet 2

Sept. 21, 1965 G. F. NIELSEN ETAL 3,207,505

RECORD CARD PROCESSING MACHINE

Filed Dec. 27, 1962 5 Sheets-Sheet 5

United States Patent Office 3,207,505
Patented Sept. 21, 1965

3,207,505
RECORD CARD PROCESSING MACHINE

Glen F. Nielsen, Lawrence A. Wilson, and Donald K. Rex, San Jose, Calif., assignors to International Business Machines Corporation, New York, N.Y., a corporation of New York Filed Dec. 27, 1962, Ser. No. 247,720
8 Claims. (Cl. 271—3)

This invention relates to the data processing system and, more particularly, to a card handling machine for use as an input-output device for a data processing system.

Many current small and medium-size data processing systems process data on a serial-by-character basis. At present, the basic limitation on the overall operating speed of a data processing system is the speed of the input-output devices. For this reason, most input-output equipment for processing record cards operates in a parallel mode, with the result that extensive buffering equipment is required. The desirability of record card processing equipment operating on a serial basis has been recognized, but generally such equipment has not been used as an input-output device in a data processing system due to the high card velocity required to achieve reasonable system operating speeds.

It is, therefore, an object of this invention to provide a card handling machine which operates in the serial-by-character mode having sufficient overall operating speed to be used as an input-output unit for a data processing system.

It is another object of this invention to provide a card handling machine having a reading and a record marking station wherein record cards may be ejected from the record marking station at a relatively high speed once punching has been completed.

According to the invention, there is provided a card handling machine which processes cards along a predetermined path including a read station and a record marking station. Means are provided within the card handling machine to feed a card to a first station wherein the card is ready for a read operation, and upon receiving a read card instruction, a control signal is generated to activate a first feeding means to feed the card through the reading station serially at a substantially constant velocity where information in the form of holes punched in the record card is sensed by a reading means and stored in a storage device. After the record card has been completely read, it is aligned at a second station ready for a record marking operation. Means are provided to energize a second feeding means for advancing the record card through the record marking station incrementally, column by column, for a record marking operation. A third feeding means is adapted to be selectively energized as soon as the record marking operation is completed to eject the record card from the record marking station at a relatively high velocity.

The foregoing and other objects, features and advantages of the invention will be apparent from the following more particular description of preferred embodiments of the invention, as illustrated in the accompanying drawings.

Figure 1:
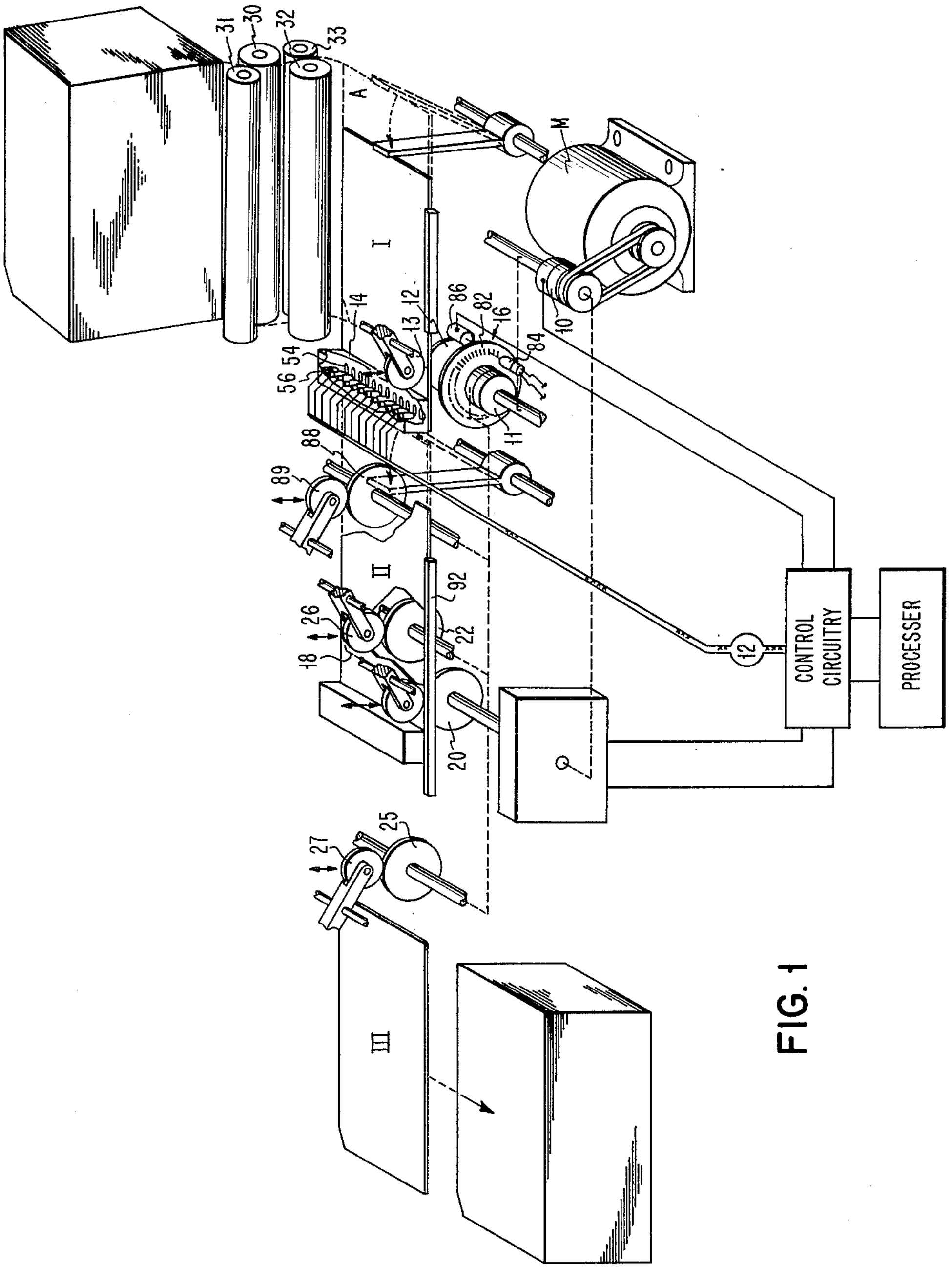
FIGURE 1 is a schematic diagrammatic view of a record card processing machine embodying the invention.

Referring to FIGURE 1, the record card processing machine comprises means for feeding record cards one at a time in parallel to a position along a card path denoted by the letter A. Aligning means are then actuated to align the record card at a first station I at which the card is in position for a read operation. At the command, from the controlling processor, for example, to read a card, a control signal is generated to actuate feed clutch means 10 to couple a main drive means M to drive first feedroll means 12. The record card is fed through the reading station 14, column by column, at essentially a fixed velocity by means of the first feedroll means, and information in the form of holes punched in the record card is sensed, column by column, and stored in the core storage of the controlling processor, for example. Timing means 16 are provided for generating control signals in synchronism with the feedroll means as each successive column passes the sensing station, and these control signals are sent to the processor for use in storing the data. Simultaneously with the reading of the first card, circuit means are actuated to feed a second card to the position marked A (FIG. 1) and is held ready for aligning at station I as soon as the reading of the first card has been completed. Second aligning means are provided to align the first record card at the position marked station II ready to be processed through a record marking station 18. When the command, from the processor, is given to punch a card, data from the processor memory is punched, column by column, as the card is advanced through the punch station incrementally by a second feedroll means 20. The second feedroll means is driven under control of an incremental drive, and when the desired number of columns of the card have been punched (determined by a counter in the processor, for example), the incremental drive is disengaged, and the card is then ejected from the record marking station under control of a third feedroll means 22 which moves the record card at a relatively high speed to station III. A preferred eject speed is the read speed since this speed minimizes synchronization requirements. As the first card is being ejected from the record marking station, the second record card is read as it is moved through the read station and registered at station II ready for punching, and a third card is fed and registered at station I ready for reading. Cornering means (not shown) are provided for moving a record card in parallel from station III into a stacker (not shown).

Figure 2:
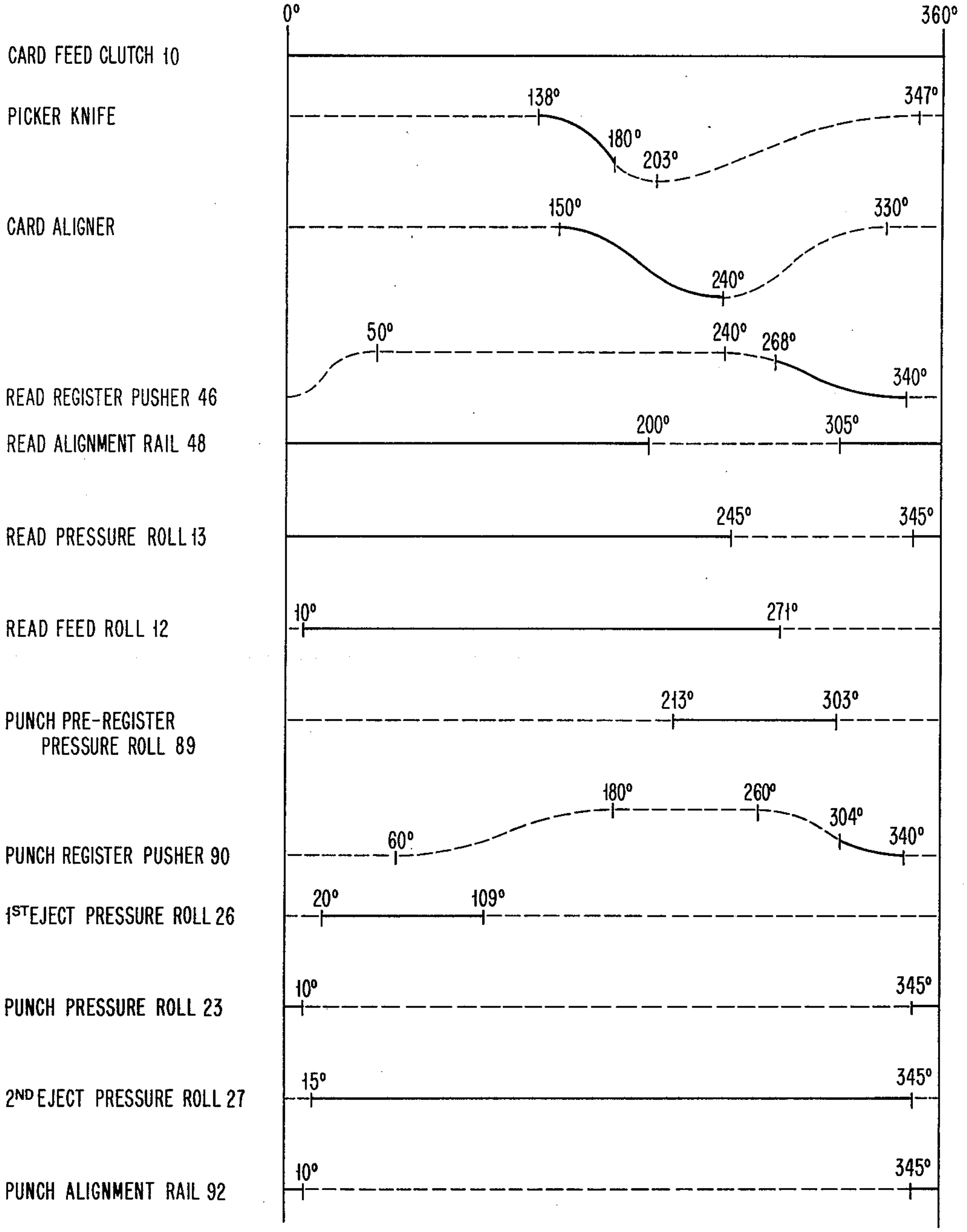
FIGURE 2 is a timing diagram showing the relative time when the operations occur in the record card processing machine of FIGURE 1.
Figure 3:
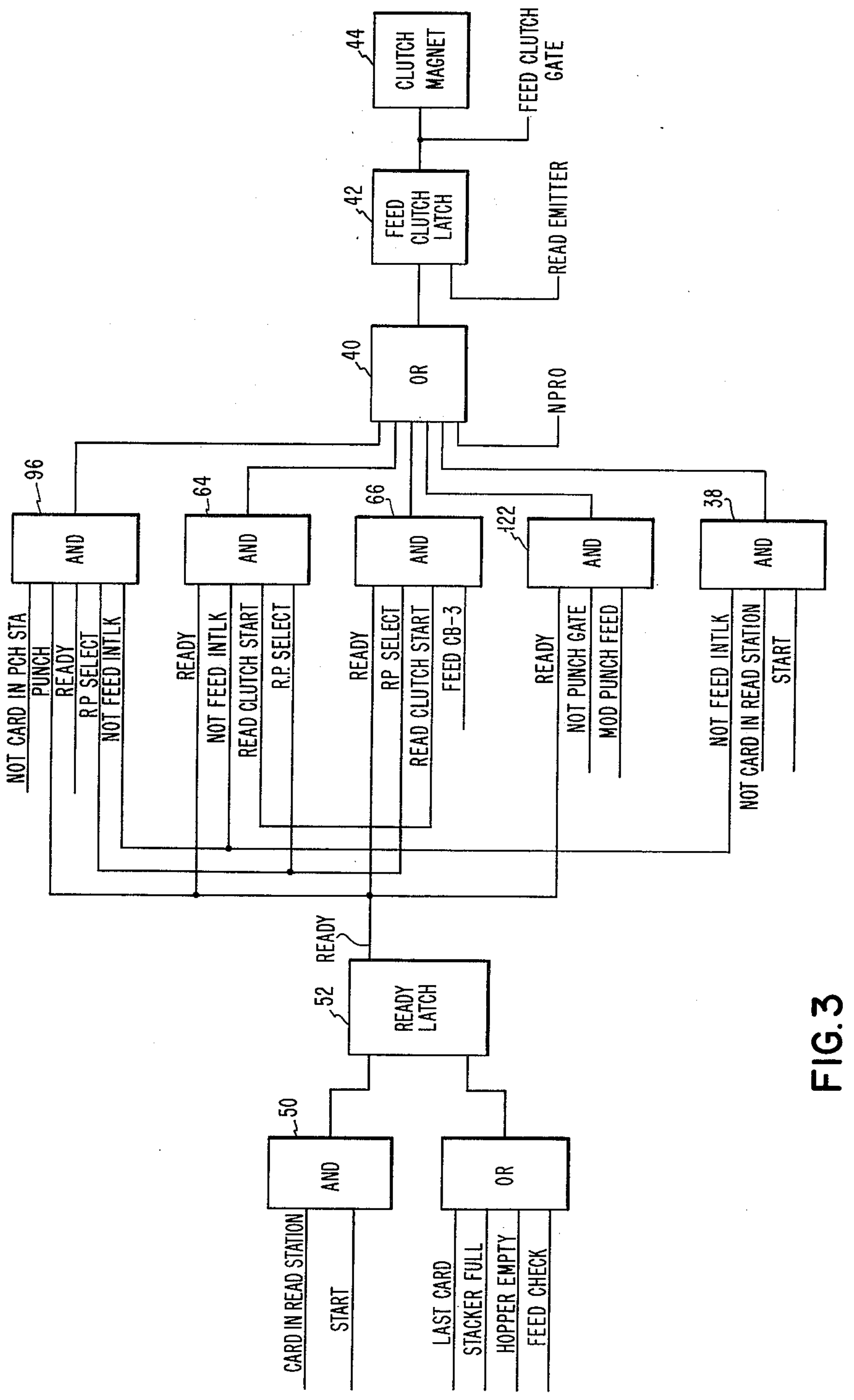
FIGURE 3 is a schematic block diagram of the feed control circuitry for the record card handling machine of FIGURE 1.
Figure 4:
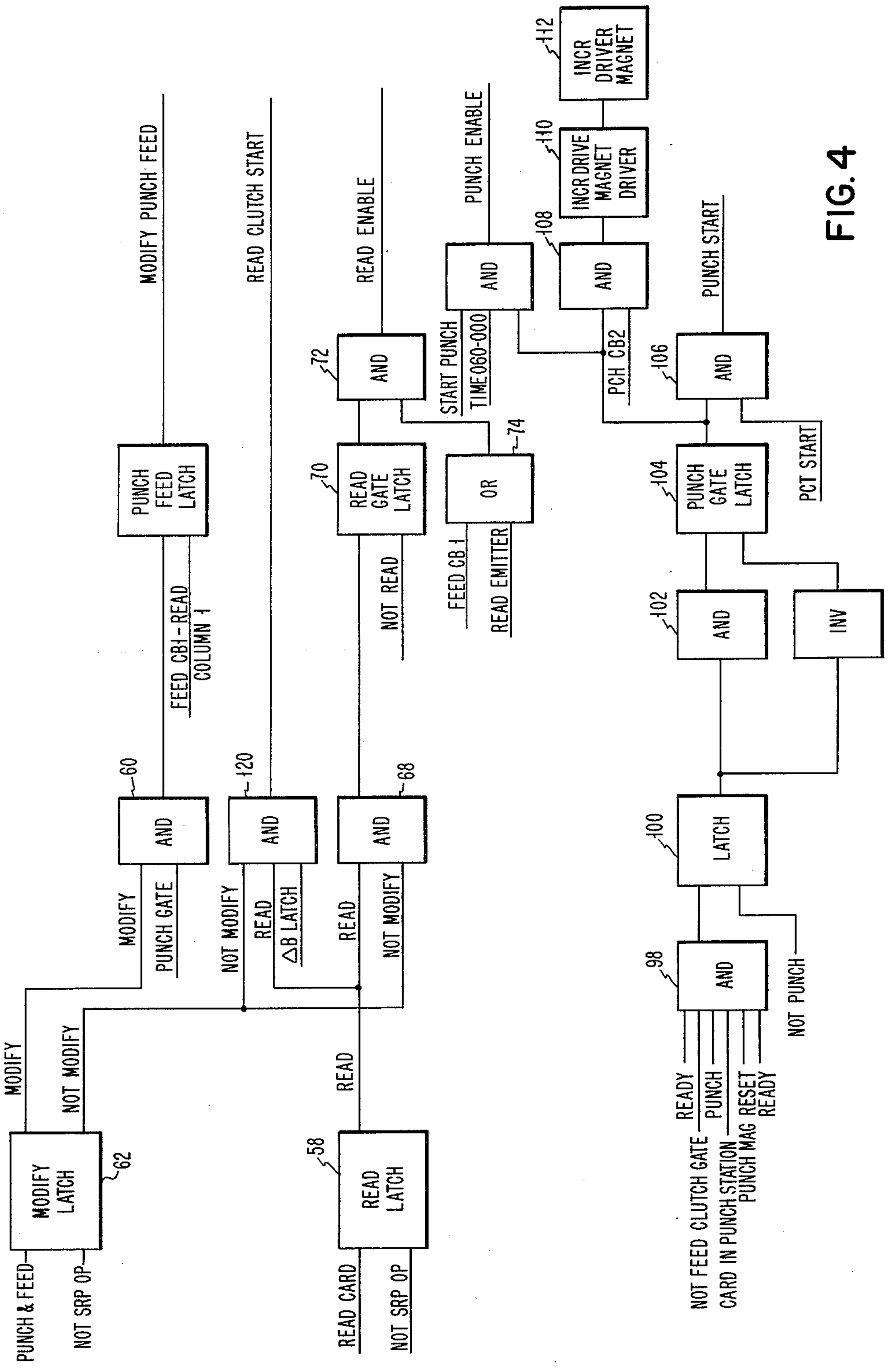
FIGURE 4 is a schematic block diagram of the operation decode and run circuitry for the record card handling machine of FIGURE 1.
Figure 6:
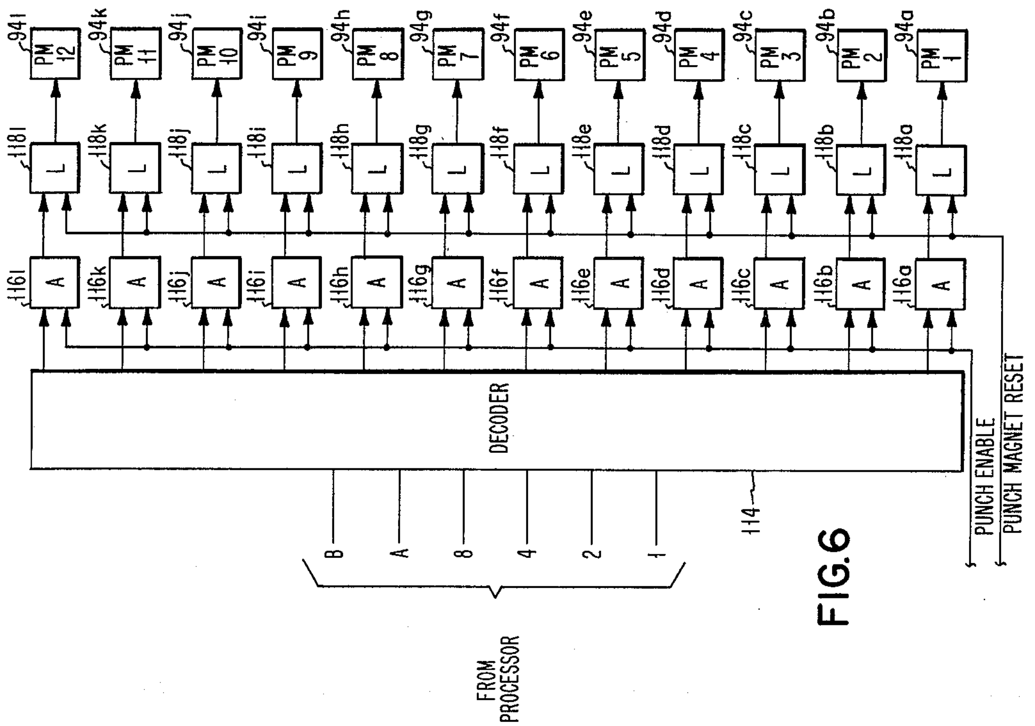
FIGURE 6 is a schematic block diagram of the punch magnet control circuitry and decoder of the record card handling machine of FIGURE 1.
Figure 5:
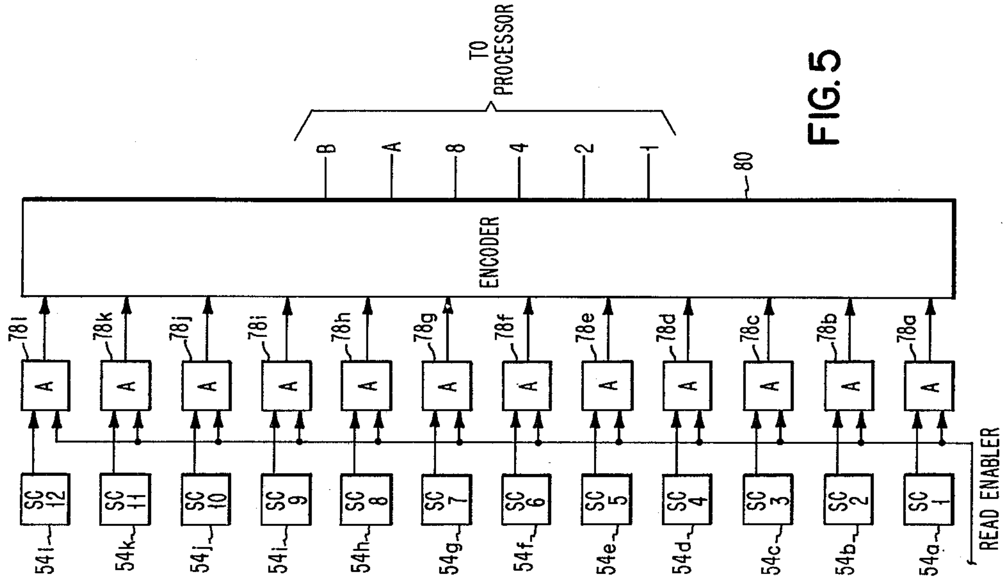
FIGURE 5 is a schematic block diagram of the read station and code converter of the record card handling machine of FIGURE 1.

In the embodiment shown, a record card shown in the upper right hand corner (FIG. 1) is fed from a card hopper, not shown, through feedrolls 30–33 to a position designated A in FIG. 1 under control of a run-in circuit (FIG. 3). The run-in circuit comprises AND circuit 38 which is conditioned by pushing the START button when no card is in the read station and the feed interlock is not actuated. The output of AND circuit 38 is coupled through OR circuit 40 to energize the Feed Clutch Latch 42 which in turn energizes the card feed clutch magnet 44 thereby actuating the feed clutch. All the feedrolls except incremental feedroll 20 are driven in synchronism with the feed clutch shaft by means of suitable belts, gears, or cams (not shown) as shown in the timing diagram of FIG. 2. The feed clutch stays energized for one cycle to energize (FIG. 2) through suitable mechanical coupling (not shown) the picker knife (not shown) and the card aligner (not shown) to move the card to position A (FIG. 1) at 240 degrees of the feed cycle. The read registration pusher 46 is energized at 260 degrees of the feed cycle (by means not shown) to align the card longitudinally so that the first column of the card is in position to be read by sensing station 14. The read alignment rail 48 is unclamped at the 200 degree point of the cycle, moved laterally to align the card against a fixed rail, and fixed in position at 305 degrees of the cycle to align the card laterally so that the rows of the card exactly register with the row elements of the sensing means. A suitable alignment mechanism is of the type shown and described in U.S. Patent application of R. E. Schopp et al., Serial Number 163,208, filed December 29, 1961, now Patent No. 3,168,309, for Card Positioning and Guiding Mechanism. The read pressure roll 13 is lowered at 345 degrees of the feed cycle by suitable cam means (not shown) to hold the card in position. At this time AND circuit 38 is deconditioned, but AND circuit 50 is then conditioned by the START push button and the output sets Ready Latch 52 to produce the signal READY. The card handling machine is then latched up awaiting a command from the controlling processor to start a read operation. The time required to start a read operation is only that necessary to energize the clutch magnet. The read station may comprise any suitable device for sensing the data holes in the card, and in the embodiment shown the sensing station comprises a solar cell 54 *a*–1 for each row of the card and a like number of light sources 56 *a*–1 mounted so that the light will cause an output in the solar cell for those rows in which a hole is present.

A read card instruction in the processor causes the signal READ CARD to be sent to the input-output device and the control circuits decode this command to activate the feed clutch control magnet and thereby initiate the read operation. The signal READ CARD sets the Read Latch 58 to produce the signal READ which is coupled to AND circuit 60. The signal ΔB Latch comes from the processor and is brought up when the processor is ready to execute the instruction. The signal NOT SRP OP comes up after each instruction so Modify Latch 62 was set to produce the output NOT MODIFY at the end of the previous instruction. Thus, AND circuit 60 is conditioned to produce the signal READ CLUTCH START. This output will partially condition AND circuits 64, 66 (FIG. 3) and the Clutch Magnet 44 will be energized through OR circuit 40 and latch 42 when the other inputs to AND circuits 64, 66 are up. FEED CB–3 is a timing pulse which denotes the earliest time within a cycle at which a feed operation can be started. The RP SELECT signal is sent by the processor and this line is up when the card handling machine is to be used in executing the current instruction. The NOT FEED INTLK signal is up from the time when the signal FEED CB–3 goes down until the feed clutch reaches a point in the cycle at which excessive wear is caused if the clutch is then energized. Once latch 42 is set, the feed clutch is energized to feed a card. The read clutch is energized to drive the read feedroll shaft at ten degrees of the feed cycle by a suitable coupling (not shown) from the card feed clutch shaft. Since the read pressure roll 13 is down from the card registration operation, the card is driven through the read station.

AND circuit 68 is conditioned by the signals READ and NOT MODIFY to produce an output which sets Read Gate Latch 70. The output of latch 70 partially conditions AND circuit 72 and a FEED CB–1 pulse is coupled through OR circuit 74 to fully condition AND circuit 72 and produce an output READ ENABLE. The signal READ ENABLE is combined with the outputs of solar cells 54 *a*–1 in AND circuits 78 *a*–1 to gate the data read from the card to encoder 80 which encodes the data in the code used by the processor.

As the cards are fed through the reading station 14, column by column, at essentially a fixed velocity the information in the form of holes punched in the record card is sensed and stored in the core storage of the processor, for example.

To generate timing pulses in synchronism with card movement there is provided timing means 16 comprising an 80 slot emitter disk mounted on the feedroll shaft, a light source 84 and a solar cell 86 mounted to sense each slot in the emitter disk at the time a respective column of the card is directly over read cells 54. The impulse that is generated by the timing means is sent to the processor for control purposes and is also used to condition AND circuit 72 through OR circuit 74 after the FEED CB–1 signal is down to continue the output READ ENABLE. The signal READ EMITTER from timing means 16 is applied to the reset input of latch 42. The feed clutch magnet therefore is energized for only a part of a feed cycle, and the clutch is mechanically latched at the end of the cycle until another command is given. Once the card is read at the read station, the card is moved by means of the punch pre-registration feedroll 88 and the associated pressure roll 89. Pressure roll 89 is lifted at 303 degrees of the feed cycle and final alignment at the second station is accomplished by the punch registration pusher 90 which is started at 304 degrees of the cycle and a punch alignment rail 92. The first column of the card is in position to be punched in the punch station and the punch pressure roll 23 is lowered at 345 degrees of the cycle to prepare for a punching operation.

The punch station comprises a punch for each of the rows of the card and the punches are operated by punch magnets 94 *a*–1. Punching is likewise under control of the associated processor and, when the punch instruction is decoded, information from the memory of the processor is punched into the card column by column as the card is moved incrementally through the punch station. At this time the drive of the card is under control of the punch feedroll 20 which is driven by an incremental drive mechanism 24. The punch pressure roll 23 is left in the operative position by the card registering operation so that the card can be driven through the punch station if a punch instruction is decoded by the processor. The incremental drive comprises a continuously rotating input shaft, means for converting the continuous rotary motion to an intermittent rotary motion, and control means selectively operable in response to an electric control signal. A suitable incremental drive is of the type shown and described in U.S. Patent application of L. A. Wilson et al., Serial Number 862,922, filed December 30, 1959, now Patent No. 3,078,732, for an Incremental Drive Mechanism.

If at this time an instruction PUNCH N COLUMNS is decorded by the processor, a signal PUNCH is sent to the output unit and the PUNCH signal from the processor partially conditions AND circuit 98. When the other inputs are present the output of AND circuit 98 sets latch 100. The output of latch 100 produces an output from AND circuit 102 when the timing signal PCH START comes up to set Punch Gate Latch 104. The output of latch 104 is combined in AND circuit 108 with the timing pulse PUNCH CB–2 to produce an output which is coupled to the Incremental Drive Magnet Driver 110 and then to the incremental drive magnet 112. The output of latch 104 is also combined in AND circuit 106 with the signal PCH START to produce the output PUNCH START which is sent to the processor signifying that the output device is ready to punch. Data is then sent from the processor storage means one character at a time to the card handling machine and the data is coupled into decoder 114 where the data is converted to card code. The data forms one input to AND circuits 116 *a*–1 and the data is gated out to set latches 118 *a*–1 by the signal PUNCH ENABLE. The output of latches 116 drives the corresponding punch magnet 94 to operate the corresponding punch. After punching is completed, the signal PUNCH MAGNET RESET is sent from the processor to reset latches 118 *a*–1.

Thus, when the desired number of columns have been punched in the card (determined by a counter in the processor, for example) the incremental drive will be disengaged and the card will stop ready to punch the next successive column. This is a very useful feature in many data processing operations since it is possible to punch, say the first fifteen columns of a card, perform some other operation in the controlling process unit, and resume punching the same card at some later time. If after the initial PUNCH CARD instruction a READ CARD instruction is initiated by the processor, then the card in the punch station will be ejected at read speed under control of eject feedrolls 22, 25 and the associated pressure rolls 26, 27 while the following card is read and then registered at the punch unit ready for punching.

If the instruction PUNCH N COLUMNS AND FEED is decoded by the processor, the signal PUNCH AND FEED is sent to the output device and this signal sets Modify Latch 62 to produce the output MODIFY. The output MODIFY is combined with the signal PUNCH GATE in AND circuit 120, and the output of AND circuit 120 sets the Punch Feed Latch to produce the output MODIFY PUNCH FEED. The punching of the N columns is carried out as before; and, when punching is completed, AND circuit 122 is conditioned as soon as the punch gate goes down to energize the clutch magnet 44 through OR circuit 40 and latch 42 to initiate a feed operation. Thus, the card is ejected from the punch unit at read speed under control of eject feedrolls 22 as the next card is being advanced through the read station and aligned at the punch unit. If the card handling machine is to be used only as a card punch, AND circuit 96 permits initiation of a feed cycle after the machine is READY when no card is aligned at the punch unit by energizing the feed clutch to feed the card to the punch station.

While the invention has been particularly shown and described with reference to a preferred embodiment thereof, it will be understood by those skilled in the art that various changes in the form and details may be made therein without departing from the spirit and scope of the invention.

What is claimed is:

1. In a record card processing machine adapted to pass the record cards along a card path comprising a plurality of processing stations, a drive means comprising:
- first feeding means for engaging said record card to drive it past a first processing station at a first relatively high speed.
- a second feeding means for engaging said record card to drive it incrementally through a second processing station at a second relatively lower speed,
- third feeding means for engaging said record card at said second processing station to eject said record card from the second processing station at a third relatively high speed, and
- control means for selectively engaging said second feeding means to drive said record card incrementally part way through said second processing station and for engaging said third feeding means for driving said record card through the remainder of said second processing station.

2. In a record card processing machine adapted to pass the record cards along a card path comprising a plurality of processing stations, a drive means comprising:
- first feeding means for engaging said record card to drive it past a first processing station at a first speed, second feeding means for engaging said record card to drive it incrementally through a second processing station at a second lower speed,
- third feeding means for engaging said record card at said second processing station to eject said record card from the second processing station at a third speed higher than said second speed, and

- control means for selectively engaging said second feeding means to drive said record card incrementally part way through said second processing station and for engaging said third feeding means for driving said read card through the remainder of said second processing station.

3. In a record card processing machine adapted to pass the record cards along a card path comprising a plurality of processing stations, a drive means comprising:
- first feedrolls for engaging said record card to drive it past a first processing station at a first relatively high speed,
- second feedrolls for engaging said record card to drive it incrementally through a second processing station at a second relatively lower speed,
- third feedrolls for engaging said record card at said second processing station to eject said record card from the second processing station at a third relatively high speed, and
- control means for selectively engaging said second feedrolls to drive said record card incrementally part way through said second processing station and for engaging said third feedrolls for driving said record card through the remainder of said second processing station.

4. A record card processing machine operable in response to a control means to pass record cards along a card path comprising a plurality of processing stations comprising:
- first feeding means for engaging said record card to drive it past a first processing station at a first relatively high speed,
- second feeding means for engaging said record card to drive it incrementally through a second processing station at a second relatively lower speed,
- third feeding means for engaging said record card at said second processing station to eject said record card from the second processing station at a third relatively high speed,
- first gating means for selectively controlling the engagement of said second feeding means for processing a predetermined portion of said record card through a said second processing station,
- second gating means for later selectively controlling the engagement of said second feeding means for resuming said record card processing through a second portion of said second processing station, and
- control means for engaging said third feeding means for driving said read card through the remainder of said second processing station.

5. A record card processing machine operable in response to a control means to pass record cards along a card path comprising a plurality of processing stations comprising:
- first feedrolls for engaging said record card to drive it past a read station a first relatively high speed,
- second feedrolls for engaging said record card to drive it incrementally through a record marking station at a second relatively lower speed,
- third feedrolls for engaging said record card as said record marking station to eject said record card from the record marking station at a third relatively higher speed,
- first electronic gating means for selectively controlling the engagement of said second feedrolls for feeding a predetermined portion of said record card through said record marking station,
- second electronic gating means for later selectively controlling the engagement of said second feedrolls for resuming feeding of said record card incrementally through a second portion of said record marking station, and
- control means for engaging said third feedrolls for driving said read card through the remainder of said record marking station.

6. In a record card processing machine adapted to pass the record cards along a card path comprising a plurality of processing stations, a drive means comprising:

first feedrolls for engaging said record card to drive it past a first processing station at a first speed, second feedrolls for engaging said record card to drive it incrementally through a second processing station at a second lower speed, third feedrolls for engaging said record card at said second processing station to eject said record card from the second processing station at said first speed, and control means for selectively engaging said second feedrolls to drive said record card incrementally part way through said second processing station and for engaging said third feedrolls for driving said record card through the remainder of said second processing station.

7. A record card processing machine operable in response to a control means to pass record cards along a card path comprising a plurality of processing stations comprising:

first feedrolls for engaging said record card to drive it past a read station at a first speed, second feedrolls for engaging said record card to drive it incrementally through a record marking station at a second speed, third feedrolls for engaging said record card at said record marking station to eject said record card from the record marking station at said first speed, first electronic gating means for selectively controlling the engagement of said second feedrolls for feeding a predetermined portion of said record card through said record marking station, second electronic gating means for later selectively controlling the engagement of said second feedrolls for resuming feeding of said record card incrementally through a second portion of said record marking station, and control means for engaging said third feedrolls for driving said read card through the remainder of said record marking station.

8. In a record card processing machine adapted to pass the record cards along a card path comprising a plurality of processing stations, a drive means comprising:

first feedrolls for engaging said record card to drive it past a read station at a read speed second feedrolls for engaging said record card to drive it incrementally through a record marking station at a lower record marking speed, third feedrolls for engaging said record card at said record marking station to eject said record card from the second processing station at said read speed, and control means for selectively engaging said second feedrolls to drive said record card incrementally part way through said record marking station and for engaging said third feedrolls for driving said record card through the remainder of said record marking station at said read speed.

References Cited by the Examiner

UNITED STATES PATENTS

| | | | |
|---|---|---|---|
| 2,846,008 | 8/58 | Dickinson | 271—3 X |
| 2,947,358 | 8/60 | Hawxhurst | 271—4 X |
| 3,002,748 | 10/61 | Wheeler | 271—41 |

ROBERT B. REEVES, *Primary Examiner.*

RAPHAEL M. LUPO, *Examiner.*

UNITED STATES PATENT OFFICE

CERTIFICATE OF CORRECTION

Patent No. 3,207,505 September 21, 1965

Glen F. Nielsen et al.

It is hereby certified that error appears in the above numbered patent requiring correction and that the said Letters Patent should read as corrected below.

Column 5, line 50, for "speed." read -- speed, --; column 6, line 42, strike out "a"; line 56, before "a", second occurrence, insert -- at --; line 60, for "as" read -- at --.

Signed and sealed this 19th day of April 1966.

(SEAL)
Attest:

ERNEST W. SWIDER
Attesting Officer

EDWARD J. BRENNER
Commissioner of Patents